(12) United States Patent
Lin

(10) Patent No.: US 11,866,886 B2
(45) Date of Patent: Jan. 9, 2024

(54) BIODEGRADABLE FOOD-GRADE PVA PAPER SUBSTRATE AND METHOD FOR MAKING THE SAME

(71) Applicant: Be Rich Limited, Taipei (TW)

(72) Inventor: Hsien-Jen Lin, Taipei (TW)

(73) Assignee: BE RICH LIMITED, Taiwan (TW)

( * ) Notice: Subject to any disclaimer, the term of this patent is extended or adjusted under 35 U.S.C. 154(b) by 111 days.

(21) Appl. No.: 17/541,375

(22) Filed: Dec. 3, 2021

(65) Prior Publication Data

US 2023/0130321 A1 Apr. 27, 2023

(30) Foreign Application Priority Data

Oct. 26, 2021 (TW) .................................. 110139695

(51) Int. Cl.
*D21H 19/12* (2006.01)
*D21H 19/82* (2006.01)
*D21H 27/00* (2006.01)

(52) U.S. Cl.
CPC ........... *D21H 19/12* (2013.01); *D21H 19/824* (2013.01); *D21H 27/00* (2013.01)

(58) Field of Classification Search
CPC ...... D21H 19/12; D21H 19/824; D21H 27/00; D21H 19/20; D21H 19/54; D21H 19/60; D21H 27/10; D21H 17/36; D21H 19/80; D21H 19/14; B32B 2037/243; B32B 2255/26; B32B 2255/28; B32B 2439/70; B05D 2201/02; B05D 2252/00;

(Continued)

(56) References Cited

U.S. PATENT DOCUMENTS 7,019,054 B2 * 3/2006 Dixit ..................... D21H 21/16
524/557
7,476,448 B2 * 1/2009 Natsui ................... D21H 19/80
427/415

(Continued)

FOREIGN PATENT DOCUMENTS

CN 108659725 A * 10/2018
CN 109135000 A * 1/2019

(Continued)

*Primary Examiner* — Jose A Fortuna
(74) *Attorney, Agent, or Firm* — Juan Carlos A. Marquez; Marquez IP Law Office, PLLC

(57) ABSTRACT

A biodegradable food-grade polyvinyl alcohol (PVA) paper substrate and a method for making the same are provided. The method includes: providing a paper substrate; preparing a first coating material by rendering PVA with a degree of alkalization of 90%-100% and a molecular weight of 100,000-300,000 into an aqueous solution in which the PVA has a weight ratio of 3%-15%; preparing a second coating material by rendering sodium trimetaphosphate into an aqueous solution in which the sodium trimetaphosphate has a molar concentration of 0.05-1 Mol/l; forming a coating layer on a surface of the paper substrate; forming a surface cross-linked layer on the coating layer; and drying. The resulting PVA paper substrate is biodegradable, of food-grade quality, and resistant to water and grease, with a grease resistance higher than or equal to that corresponding to kit No. 6 in a TAPPI T559 pm-96 standard test.

7 Claims, 3 Drawing Sheets

(58) Field of Classification Search
CPC .......... B05D 7/04; B05D 7/24; C08J 2429/04; C08J 7/0427; Y02W 90/10
See application file for complete search history.

(56) References Cited

U.S. PATENT DOCUMENTS

| | | | | |
|---|---|---|---|---|
| 8,877,678 B2 * | 11/2014 | Koyama | ................ | B41M 5/508 |
| | | | | 503/200 |
| 9,388,532 B2 * | 7/2016 | Koyama | ................ | B41M 5/41 |
| 11,052,694 B2 * | 7/2021 | Kishimoto | ............ | D21H 27/30 |
| 2004/0005341 A1 * | 1/2004 | Dixit | ..................... | D21H 21/16 |
| | | | | 424/401 |
| 2006/0216537 A1 * | 9/2006 | Natsui | ................... | D21H 19/80 |
| | | | | 162/137 |
| 2019/0001727 A1 * | 1/2019 | Daudin | .................... | B41M 5/42 |
| 2020/0308453 A1 * | 10/2020 | Kishimoto | ................ | C09J 7/21 |
| 2021/0040693 A1 * | 2/2021 | Glenn | ................... | C09D 129/04 |
| 2021/0171788 A1 * | 6/2021 | O'Hare | ..................... | C08K 9/04 |
| 2021/0292590 A1 * | 9/2021 | Jin | ............................ | B05D 1/28 |
| 2023/0130321 A1 * | 4/2023 | Lin | ......................... | D21H 27/00 |
| | | | | 162/137 |

FOREIGN PATENT DOCUMENTS

| | | | | | |
|---|---|---|---|---|---|
| CN | 107199794 B | * | 8/2019 | .............. | B41M 5/26 |
| CN | 111719339 B | * | 11/2021 | .............. | D21H 21/36 |
| CN | 114457627 A | * | 5/2022 | | |
| EP | 1705288 B1 | * | 1/2014 | .............. | D21H 129/12 |
| EP | 2599914 B1 | * | 10/2016 | .............. | B41M 5/41 |
| WO | WO-0214426 A1 | * | 2/2002 | | |
| WO | WO-2018200790 A1 | * | 11/2018 | | |
| WO | WO-2019092453 A1 | * | 5/2019 | .............. | B05D 7/04 |
| WO | WO-2019092454 A1 | * | 5/2019 | | |
| WO | WO-2019130968 A1 | * | 7/2019 | .............. | B41M 5/41 |

* cited by examiner

BIODEGRADABLE FOOD-GRADE PVA PAPER SUBSTRATE AND METHOD FOR MAKING THE SAME

BACKGROUND OF THE INVENTION

1. Technical Field

The present invention relates to a biodegradable food-grade polyvinyl alcohol (PVA) paper substrate and a method for making the same. More particularly, the invention relates to a biodegradable food-grade PVA paper substrate for use in making food-grade containers such as beverage cups or takeout boxes, and to a method for making the same.

2. Description of Related Art

Taiwan Patent No. I418683 discloses non-fluorine greaseproof paper and a method for making the same, wherein the method includes: preparing a mixture of a carboxymethyl cellulose solution and a PVA solution and a mixture of a starch derivative solution and a PVA solution; mixing the two mixtures to produce a mixed solution in which the mixing ratio of the carboxymethyl cellulose solution to the starch derivative solution is 1:1-1:10 by weight; and coating a sheet of paper with the mixed solution, with the coating amount per side being 0.5-1.5 g/m². When tested by the TAPPI T559 pm-96 method, the resulting greaseproof paper shows a grease resistance higher than that corresponding to kit No. 6.

Taiwan Patent No. I560337 discloses a method for making greaseproof paper and greaseproof paper made by the method, wherein the method for making greaseproof paper includes: preparing a bulk solution (which is one, or a combination of at least two, selected from the group consisting of a starch derivative solution, a PVA solution, and an acrylic acid-based polymeric resin); mixing an additive (which is one, or a combination of at least two, selected from the group consisting of a surface sizing agent, a water repellent, and a wet-strength agent) into the bulk solution at a mixing ratio of 1:100-20:100 by weight to produce a coating liquid; and coating a paper substrate with the coating liquid, with the coating amount per side being 1.0-4.0 g/m². When tested by the TAPPI T559 cm-12 standard testing method, the resulting greaseproof paper shows a grease resistance equal to or higher than that corresponding to kit No. 7.

Taiwan Patent No. I568805 discloses grease-resistant coatings for fibrous materials (in particular paper used for packaging) and nonwoven, woven, or knitted textile materials. None of the afore-cited prior art is completely resistant to water and grease and is completely biodegradable.

BRIEF SUMMARY OF THE INVENTION

The present invention provides a biodegradable food-grade PVA paper substrate and a method for making the same, the primary objective being to solve the prior art problem that the additives (e.g., resin, boric acid, glutaraldehyde, or glyoxal) used in conventional PVA products may result in toxicity or hinder complete biodegradability.

The present invention provides a method for making a biodegradable food-grade PVA paper substrate, and the method is carried out as follows. To start with, a substrate, or more specifically a paper substrate, is provided. A first coating material is prepared by rendering PVA with a degree of alkalization of 90%-100% and a molecular weight of 100,000-300,000 into an aqueous solution in which the PVA has a weight ratio of 3%-15%. A second coating material is prepared by rendering sodium trimetaphosphate into an aqueous solution in which the sodium trimetaphosphate has a molar concentration of 0.05-1 Mol/l. At least one surface of the paper substrate is then coated with the first coating material to form at least one coating layer, and the at least one coating layer is coated with the second coating material in order for the second coating material to cross-link with the surface of the at least one coating layer and thereby form at least one surface cross-linked layer, leaving a portion of the at least one coating layer that is on the inner side of the at least one surface cross-linked layer in a non-cross-linked state. The paper substrate, the at least one coating layer, and the at least one surface cross-linked layer are subsequently dried.

The present invention further provides a biodegradable food-grade PVA paper substrate made by the foregoing PVA paper substrate making method.

Implementation of the present invention can produce at least the following advantageous effects:
1. Grease resistance and water resistance can be achieved.
2. Food/beverage containers and the like can be made biodegradable and food-grade.
3. The resulting product is water-soluble and/or biodegradable, causes no pollution to the environment, and can be completely returned to nature.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
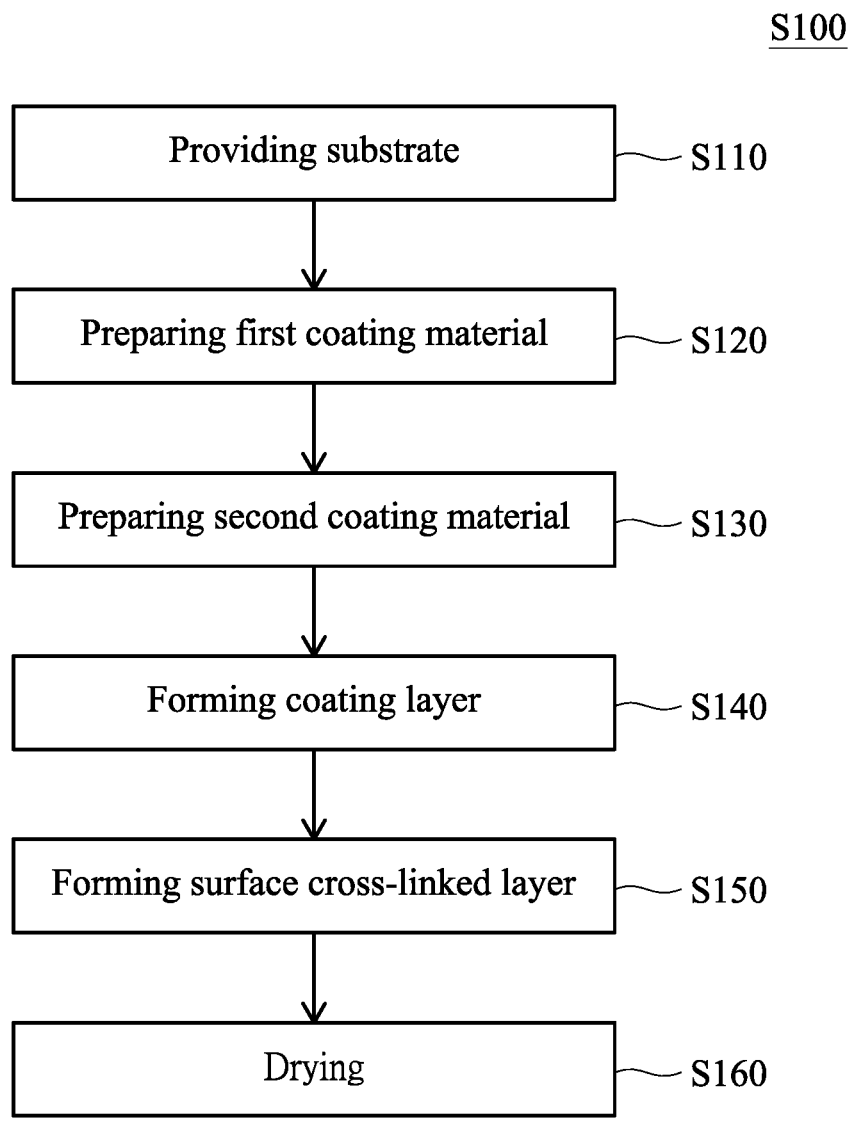
FIG. 1 is a flowchart of a method for making a biodegradable food-grade PVA paper substrate.
Figure 2:
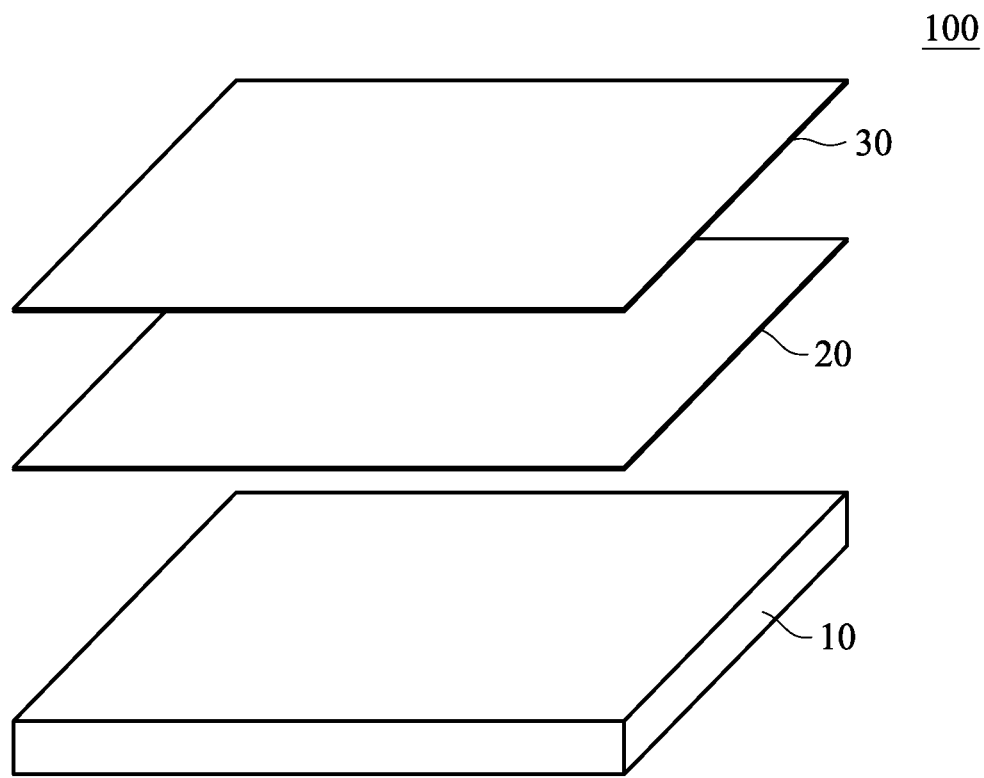
FIG. 2 is an exploded perspective view of a biodegradable food-grade PVA paper substrate.
Figure 3:
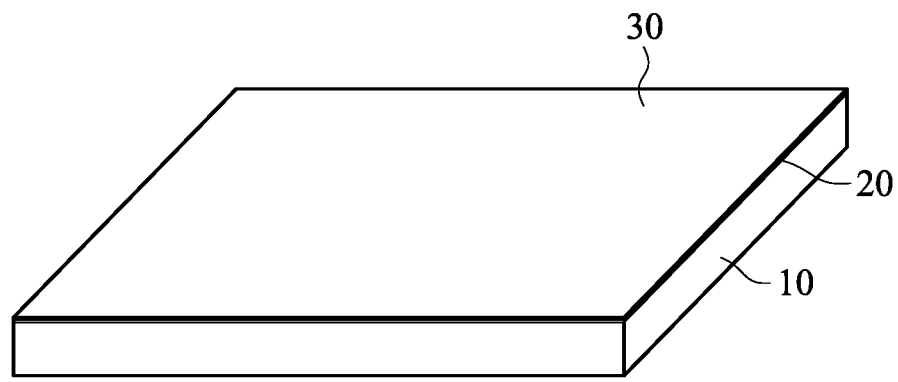
FIG. 3 is a sectional perspective view of a biodegradable food-grade PVA paper substrate.

Referring to FIG. 1 to FIG. 3 for an embodiment of the present invention, a method S100 for making a biodegradable food-grade PVA paper substrate includes the steps of: providing a substrate (S110), preparing a first coating material (S120), preparing a second coating material (S130), forming a coating layer (S140), forming a surface cross-linked layer (S150), and drying (S160).

In step S110 of providing a substrate, a paper substrate 10 is provided.

In step S120 of preparing a first coating material, PVA having a degree of alkalization of 90%-100% and a molecular weight of 100,000-300,000 is mixed with water to produce an aqueous solution in which the PVA has a weight ratio of 3%-15%. PVA is a stable, non-toxic water-soluble polymer and is therefore completely biodegradable.

In step S130 of preparing a second coating material, sodium trimetaphosphate is mixed with water to produce an aqueous solution in which the sodium trimetaphosphate has a molar concentration of 0.05-1 Mol/l. Sodium trimetaphosphate is water-soluble and completely biodegradable, is essentially a polymeric phosphate that has a ring-shaped structure and can be used in food, and in terms of physiological toxicity is one of the safest polymeric phosphates for use in food.

In step S140 of forming a coating layer, at least one surface of the paper substrate 10 is coated with the first coating material to form at least one coating layer 20. For example, the coating process involves applying the first coating material over the at least one surface of the paper substrate 10 at a coating amount of 1-10 g/m$^2$ in order to form the at least one coating layer 20.

In step S150 of forming a surface cross-linked layer, the at least one coating layer 20 is coated with the second coating material. The second coating material is a cross-linking agent and therefore will cross-link with the surface of the at least one coating layer 20 when applied over the at least one coating layer 20, thereby forming at least one surface cross-linked layer 30 on the at least one coating layer 20.

As the cross-linking reaction takes place only in the surface of the at least one coating layer 20 when the second coating material is applied over the at least one coating layer 20, the second coating material does not infiltrate the inner portion of the coating layer 20. A portion of the coating layer 20 that is on the inner side of the at least one surface cross-linked layer 30, therefore, remains in a non-cross-linked state.

In step S160 of drying, the paper substrate 10, the at least one coating layer 20, and the at least one surface cross-linked layer 30 are dried to remove excess moisture therefrom and to cure the at least one surface cross-linked layer 30 and the at least one coating layer 20 on the paper substrate 10.

The foregoing method S100 for making a PVA paper substrate produces a PVA paper substrate 100 that is resistant to both water and grease. When tested by the TAPPI T559 pm-96 standard testing method, the PVA paper substrate 100 shows a grease resistance higher than or equal to that corresponding to kit No. 6.

Another embodiment of the present invention provides the PVA paper substrate 100. The PVA paper substrate 100 is made by the foregoing method S100 for making a PVA paper substrate and is biodegradable and of food-grade quality.

Figure 4:
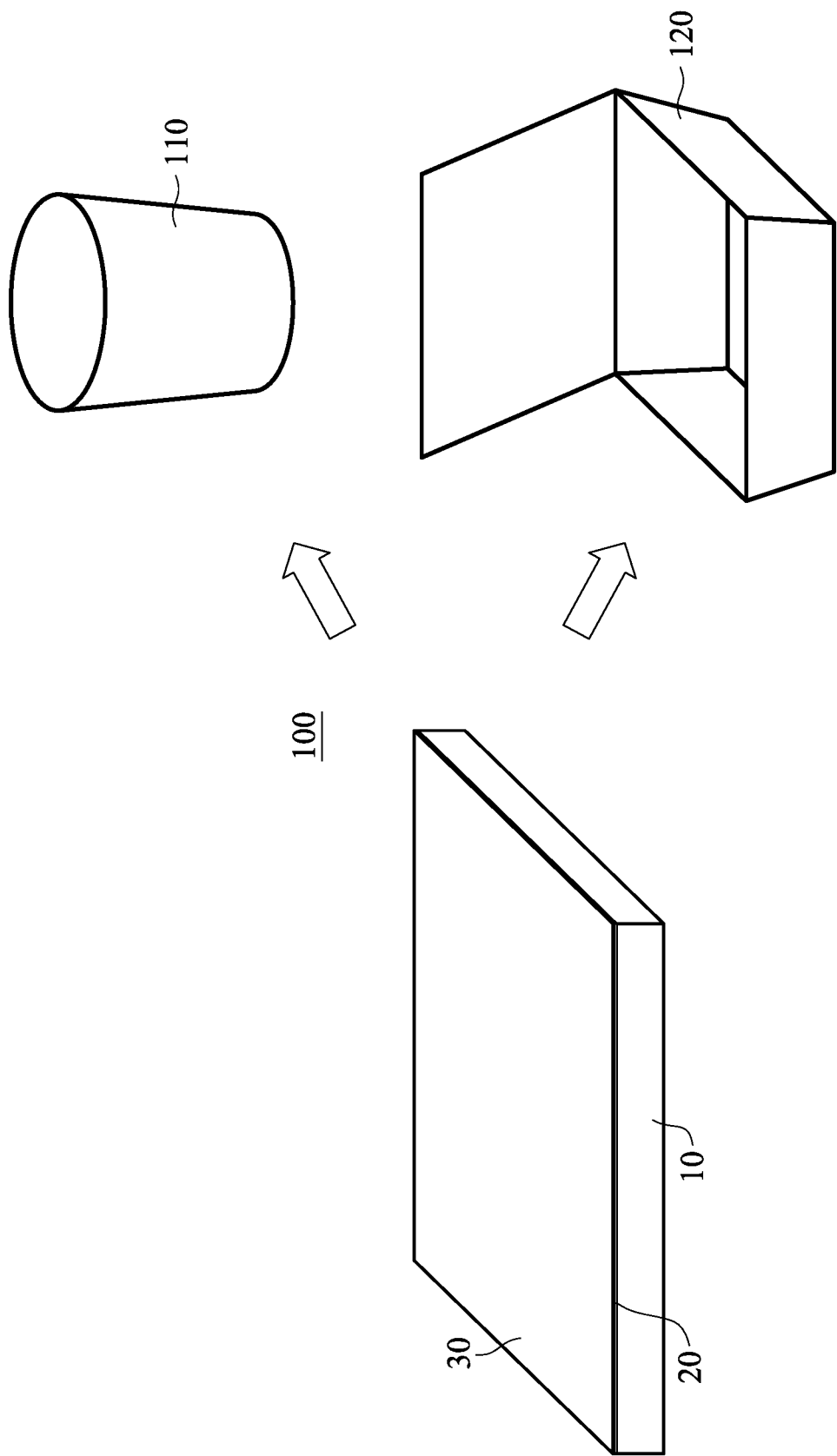
FIG. 4 shows some application examples of a biodegradable food-grade PVA paper substrate.

Referring to FIG. 4, the biodegradable food-grade PVA paper substrate 100 can be made into a beverage cup 110, a takeout box 120, or the like. Since only the surface cross-linked layer 30 will be in contact with food, the sodium trimetaphosphate-containing surface cross-linked layer 30 ensures safety with regard to physiological toxicity. Moreover, the surface cross-linked layer 30 prevents grease and water from entering the paper substrate 10 so that a food/beverage container made of the PVA paper substrate 100 will not be damaged by, for example, hot soup or oil during use.

As the paper substrate 10, the coating layer 20, and the surface cross-linked layer 30 are non-toxic and water-soluble and/or biodegradable materials, food/beverage containers made of the PVA paper substrate 100 will not pollute the environment at all and can be completely returned to nature.

The above description is only the preferred embodiments of the present invention and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changed and modifications of the above embodiments according to the material contents of the invention shall be within the scope of the technical solution of the present invention.

What is claimed is:

1. A method for making a biodegradable food-grade polyvinyl alcohol (PVA)-coated paper substrate, comprising the steps of:

providing a substrate, in which step a paper substrate is provided;

preparing a first coating material, in which step PVA with a degree of alkalization of 90%-100% and a molecular weight of 100,000-300,000 is rendered into an aqueous solution with a weight ratio of the PVA being 3%-15%;

preparing a second coating material, in which step sodium trimetaphosphate is rendered into an aqueous solution with a molar concentration of the sodium trimetaphosphate being 0.05-1 Mol/l;

forming a coating layer, in which step at least a surface of the paper substrate is coated with the first coating material to form at least one said coating layer;

forming a surface cross-linked layer, in which step the at least one coating layer is coated with the second coating material in order for the second coating material to crosslink with a surface of the at least one coating layer and thereby form at least one said surface cross-linked layer, with the at least one coating layer having a portion that is on an inner side of the at least one surface cross-linked layer and remains in a non-crosslinked state; and drying, in which step the paper substrate, the at least one coating layer, and the at least one surface cross-linked layer are dried.

2. The method for making the PVA-coated paper substrate as claimed in claim 1, wherein the at least one coating layer is formed by coating the at least a surface of the paper substrate with the first coating material at a coating amount of 1-10 g/m$^2$.

3. The method for making the PVA-coated paper substrate as claimed in claim 1, wherein the PVA-coated paper substrate made by the method is resistant to water and grease and has a grease resistance higher than or equal to a grease resistance corresponding to kit No. 6 in a TAPPI T559 pm-96 standard test.

4. A biodegradable food-grade polyvinyl alcohol (PVA)-coated paper substrate, wherein the PVA-coated paper substrate is made by the method comprising the steps of:

providing a substrate, in which step a paper substrate is provided;

preparing a first coating material, in which step PVA with a degree of alkalization of 90%-100% and a molecular weight of 100,000-300,000 is rendered into an aqueous solution with a weight ratio of the PVA being 3%-15%;

preparing a second coating material, in which step sodium trimetaphosphate is rendered into an aqueous solution with a molar concentration of the sodium trimetaphosphate being 0.05-1 Mol/l;

forming a coating layer, in which step at least a surface of the paper substrate is coated with the first coating material to form at least one said coating layer;

forming a surface cross-linked layer, in which step the at least one coating layer is coated with the second coating material in order for the second coating material to cross-link with a surface of the at least one coating layer and thereby form at least one said surface cross-linked layer, with the at least one coating layer having a portion that is on an inner side of the at least one surface cross-linked layer and remains in a non-cross-linked state; and drying, in which step the paper substrate, the at least one coating layer, and the at least one surface cross-linked layer are dried.

5. The biodegradable food-grade polyvinyl alcohol (PVA)-coated paper substrate as claimed in claim 4, wherein the PVA-coated paper substrate made by the method is resistant to water and grease and has a grease resistance higher than or equal to a grease resistance corresponding to kit No. 6 in a TAPPI T559 pm-96 standard test.

6. A biodegradable food-grade polyvinyl alcohol (PVA)-coated paper substrate, wherein the PVA-coated paper substrate is made by the method comprising the steps of:

providing a substrate, in which step a paper substrate is provided;

preparing a first coating material, in which step PVA with a degree of alkalization of 90%-100% and a molecular weight of 100,000-300,000 is rendered into an aqueous solution with a weight ratio of the PVA being 3%-15%;

preparing a second coating material, in which step sodium trimetaphosphate is rendered into an aqueous solution with a molar concentration of the sodium trimetaphosphate being 0.05-1 Mol/l;

forming a coating layer, in which step at least a surface of the paper substrate is coated with the first coating material to form at least one said coating layer;

forming a surface cross-linked layer, in which step the at least one coating layer is coated with the second coating material in order for the second coating material to cross-link with a surface of the at least one coating layer and thereby form at least one said surface cross-linked layer, with the at least one coating layer having a portion that is on an inner side of the at least one surface cross-linked layer and remains in a non-cross-linked state; and drying, in which step the paper substrate, the at least one coating layer, and the at least one surface cross-linked layer are dried, wherein the at least one coating layer is formed by coating the at least a surface of the paper substrate with the first coating material at a coating amount of 1-10 g/m$^2$.

7. The biodegradable food-grade polyvinyl alcohol (PVA)-coated paper substrate as claimed in claim 6, wherein the PVA-coated paper substrate made by the method is resistant to water and grease and has a grease resistance higher than or equal to a grease resistance corresponding to kit No. 6 in a TAPPI T559 pm-96 standard test.

* * * * *